(12) United States Patent
Sato (10) Patent No.: US 8,330,996 B2
(45) Date of Patent: Dec. 11, 2012

(54) IMAGE FORMING APPARATUS (75) Inventor: Hideki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1343 days.

(21) Appl. No.: 11/846,903

(22) Filed: Aug. 29, 2007

(65) Prior Publication Data

US 2008/0055656 A1    Mar. 6, 2008

(30) Foreign Application Priority Data

Sep. 1, 2006 (JP) .................................. 2006-237420

(51) Int. Cl.
*H04N 1/40* (2006.01)
*B42D 15/00* (2006.01)
*G06K 9/00* (2006.01)
*H04L 9/32* (2006.01)

(52) U.S. Cl. ........ 358/3.28; 283/113; 382/100; 713/176
(58) Field of Classification Search .................. None
See application file for complete search history.

(56) References Cited

U.S. PATENT DOCUMENTS

| | | | |
|---|---|---|---|
| 6,603,864 B1 * | 8/2003 | Matsunoshita | 382/100 |
| 6,741,758 B2 * | 5/2004 | Hayashi et al. | 382/294 |
| 7,894,624 B2 * | 2/2011 | Kawakami | 382/100 |
| 2002/0157005 A1 * | 10/2002 | Brunk et al. | 713/176 |
| 2007/0297642 A1 * | 12/2007 | Kawakami | 382/100 |

FOREIGN PATENT DOCUMENTS

| | | |
|---|---|---|
| JP | 2003205661 A1 | 7/2003 |
| JP | 2005-229176 A | 8/2005 |

* cited by examiner

*Primary Examiner* — Vincent Rudolph
*Assistant Examiner* — Marcus T Riley
(74) *Attorney, Agent, or Firm* — Panitch Schwarze Belisario & Nadel LLP (57) ABSTRACT

An image forming apparatus is supplied capable of, with respect to a manuscript in which watermark information 25 are buried, limiting an ease copy of manuscript whose watermark information can not be analyzed through stopping the copy of the manuscript according to the degradation state of the watermark information. In the image forming apparatus having copy function, a reading section to read manuscript on which watermark information are buried in an image; a judging section to judge the degradation state of the watermark information; and a controlling section to stop copy of the read manuscript when the watermark information is judged degrading are provided.

12 Claims, 11 Drawing Sheets

PRINTER NUMBER : 1 2 3 4 5

↓ CHARACTER CODE CHANGE

BIT STRING :
0 0 1 1 0 0 0 1 0 0 1 1 0 0 1 0 0 0 1 1 0 0 1 1 0 0 1 1 0 1 0 0 0 0 1 1 0 1 0 1

↓ DIVIDE

DIVISION BIT STRINGS
OBTAINED BY DIVIDING THE    0 0 1 1 0 0 0 1
BIT STRING PER 8-BITS :     0 0 1 1 0 0 1 0
                            0 0 1 1 0 0 1 1
                            0 0 1 1 0 1 0 0
                            0 0 1 1 0 1 0 1

↓ LOGICAL CALCULATION

STANDARD INFORMATION :   0 0 1 1 0 0 0 1

BECAUSE WATERMARK INFORMATION DEGRADE, COPY IS IMPOSSIBLE.

IMAGE FORMING APPARATUS

BACKGROUND OF THE INVENTION

1. Field of the Invention

The invention relates to an image forming apparatus having copying function.

2. Related Background Art

In recent years, in order to inhibit illegal copy or falsification of manuscript with high secret, a technology to bury specific addition information serving as electronic watermark into manuscript data i.e. image data is put to practical use.

Such invention utilizing the electronic watermark technology is stated in, for example, patent document 1. The invention stated in the patent document 1 buries limitation information which is used to limit copy times and serves as electronic watermark into image data, and prohibits copy exceeding the copy times predetermined by the limitation information.

Patent document 1: Japan patent publication 2005-229176.

However, because the manuscript is repeatedly copied or it is dirtied or damaged, there is a possibility that the electronic watermark information buried in the manuscript degrades so that the electronic watermark information can not be correctly read. In the case, in the invention stated in the patent document 1, because the electronic watermark information can not be analyzed, there is a danger that the manuscript is copied without appropriately performing copy prohibition. That is, because the electronic watermark information can not be analyzed, illegal copy or falsification of manuscript can not be judged. Thus, it is difficult to keep the manuscript secret.

SUMMARY OF THE INVENTION

It is, therefore, an object of the invention to provide an image forming apparatus capable of solving the above problem.

According to the present invention, there is provided an image forming apparatus, comprising a reading section for reading the manuscript having image in which at least one watermark information is buried; a judging section for judging a state of the watermark information; a deciding section for deciding whether to copy on the basis of a judgment result of the judging section; and a controlling section for performing a copy of the manuscript on the basis of a decision of the deciding section.

Effect of the Present Invention:

According to the present invention, the state of watermark information buried in image data is judged, whether to copy based on a judgment result of the state of watermark information is decided, and a copy of the manuscript is performed on the basis of the decision. Therefore, it is possible to limit an ease copy of the manuscript whose watermark information can not be analyzed, so that it is possible to keep the manuscript secret.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

<Embodiment 1>

<Structure of Embodiment 1>

Figure 1:
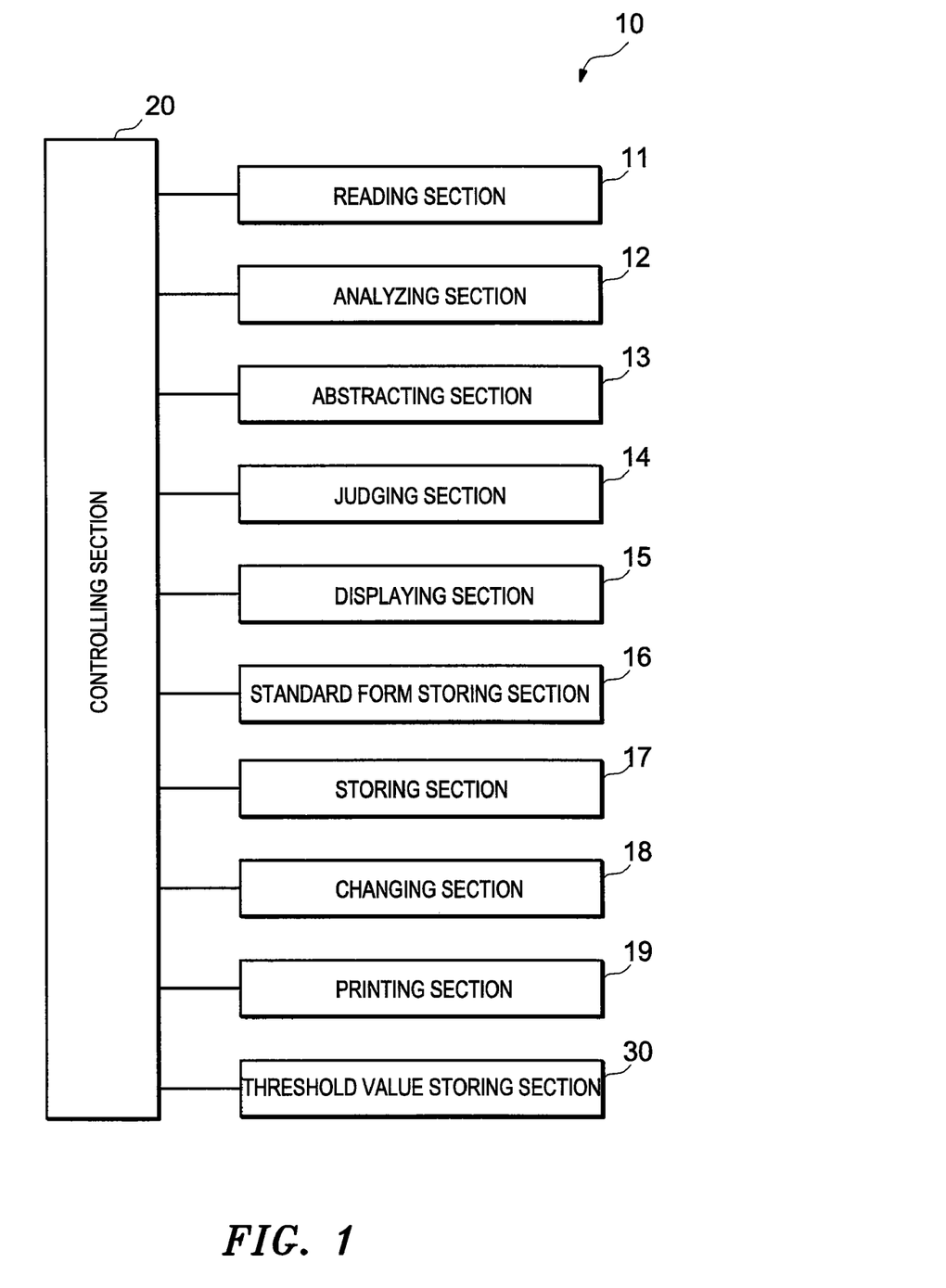
FIG. 1 is a block diagram showing a structure of an image forming apparatus in embodiment 1 of the present invention.

FIG. 1 is a block diagram showing a structure of an image forming apparatus in embodiment 1 of the present invention.

An image forming apparatus 10 of the present invention as shown by FIG. 1, in order to copy manuscript in which watermark information is plurally buried, comprises a reading section 11, an analyzing section 12, an abstracting section 13, a judging section 14, a displaying section 15, a standard form storing section 16, a storing section 17, a changing section 18, a printing section 19, a threshold value storing section 30, and a controlling section 20 which is used for controlling these sections 11-19 and 30.

The reading section 11 executes operation to read manuscript data with respect to a manuscript.

Figure 2:
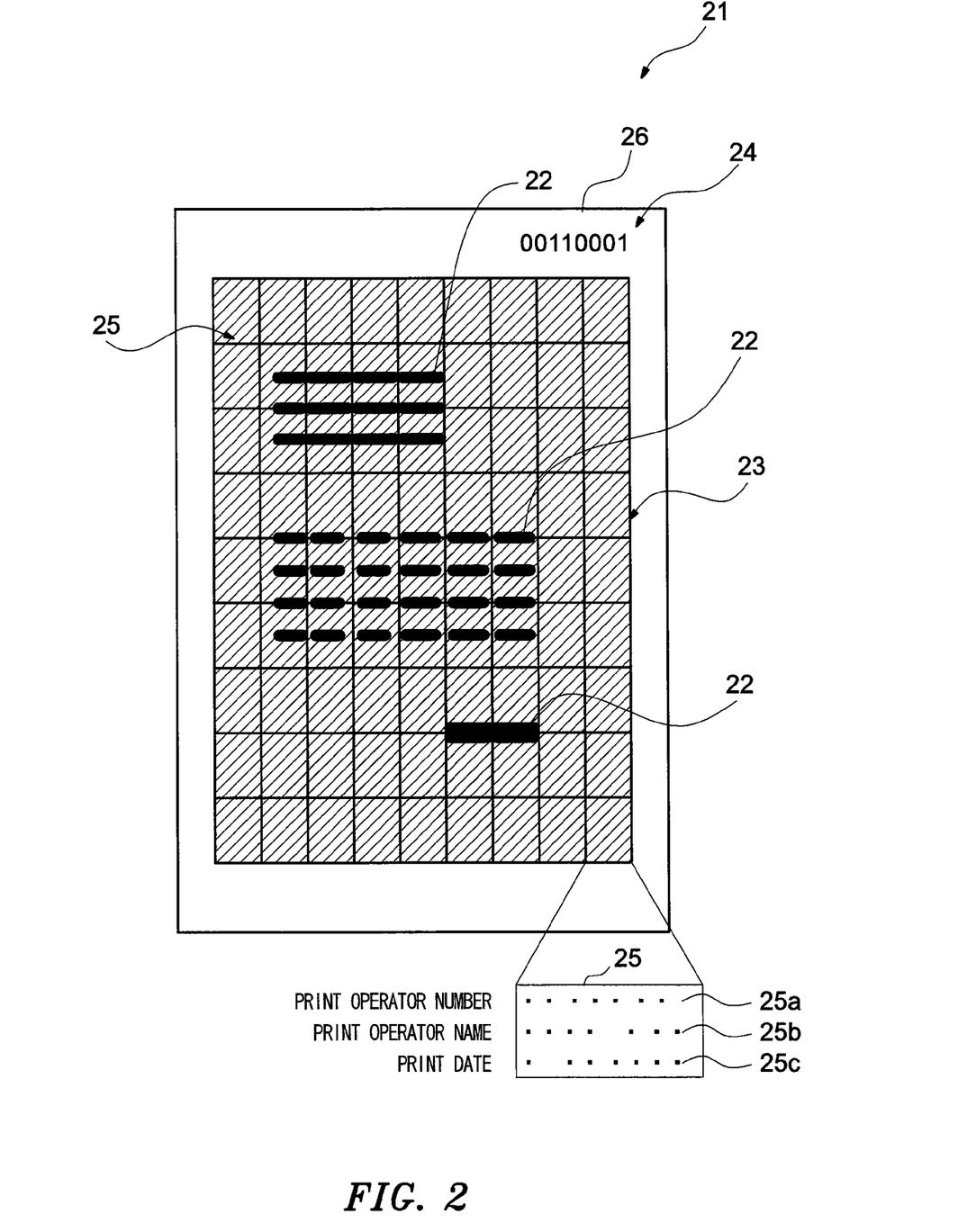
FIG. 2 is an explanation diagram showing a formation of a manuscript in embodiment 1 of the present invention.

FIG. 2 is an explanation diagram showing a formation of a manuscript in embodiment 1 of the present invention.

As shown by FIG. 2, on a manuscript 21, an image formation area 23 and a specific area 24 are furnished, and an image 22 made from image data is formed in the image formation area 23.

In the image formation area 23, identification information relative to the image 22 is plurally buried as covering whole page, as watermark information 25. The identification information is, for example, print operator number 25a, print operator name 25b, print date 25c and the like of the image 22. Then, through changing the information into character code, bit information is obtained. The bit information is buried in the image formation area 23 as bit pattern formed according to whether dot exists. Further, on the specific area 24, standard information 26 which is used when judging whether the watermark information 25 degrades is formed. The standard information 26 is expressed in a form that the above-stated identification information is changed by a predetermined logical calculation.

Next, regarding a method for making the standard information 26 from the identification information, it will be explained by an example of the print operator number 25a. Moreover, here, the print operator number 25a is set to "12345".

Figure 3:
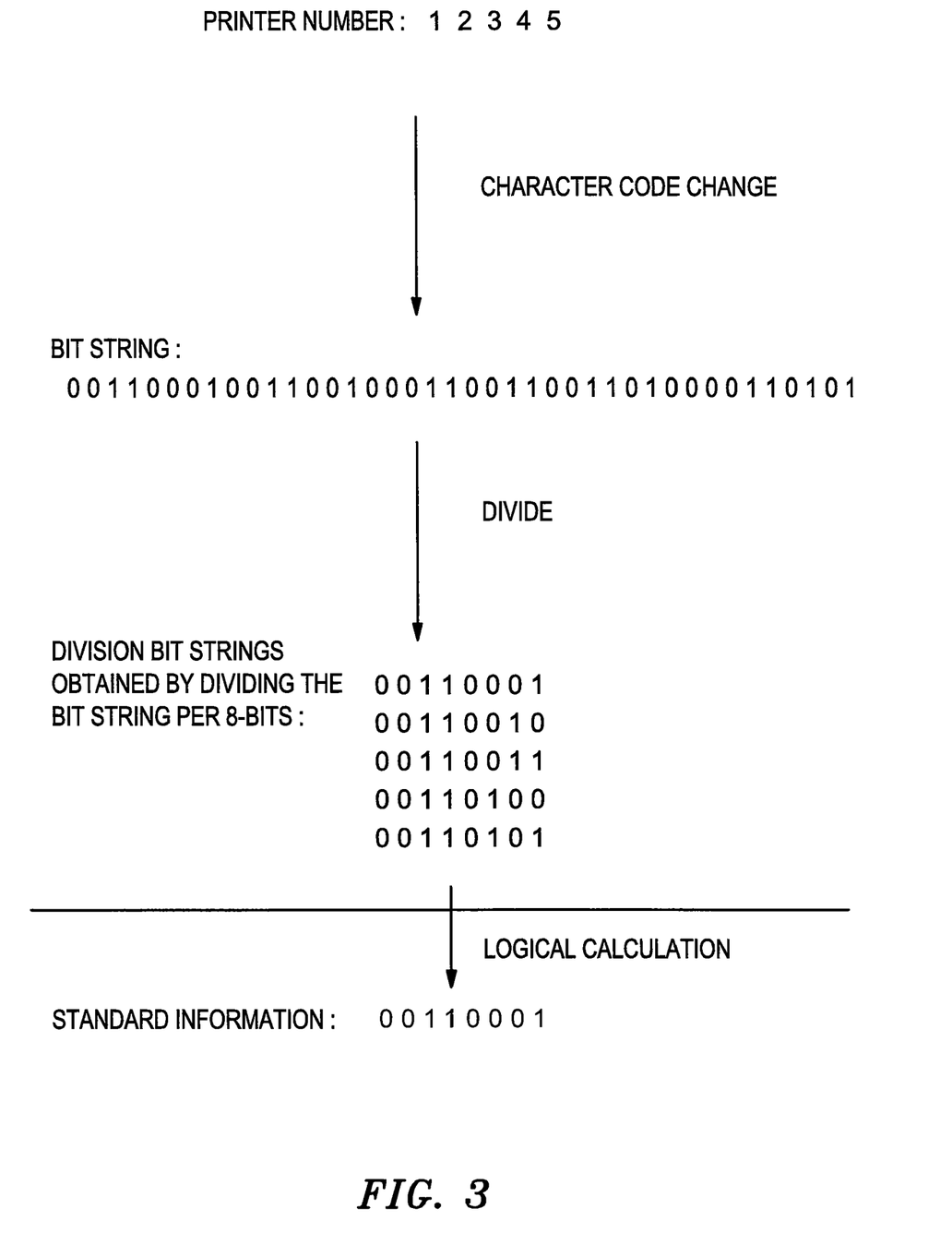
FIG. 3 is a diagram for explaining a method to make standard information from identification information.

FIG. 3 is a diagram for explaining a method to make standard information from identification information.

As shown by FIG. 3, the characters expressing the print operator number 25a i.e. the identification information are "12345". First is to change the "12345" into character code. The change about the character code may use, for example, a code system of one byte of ASCII or the like. In the case to change the "12345" into character code of respective byte, bit string of 40-figures, i.e. "0011000100110010001100110011010000110101" is obtained. Through dividing the bit string of 40-figures per 8-bits (predetermined number), respective division bit strings of "00110001", . . . , "00110101" are obtained. Then, with respect to bits in the same bit position in these division bit strings, through respectively executing predetermined logical calculation, for example, OR calculation, the standard information 26 is made.

Moreover, in the embodiment, the standard information 26 is calculated by executing logical calculation. However, it is also possible to calculate the standard information 26 by using Hash function called MD5 or SHA-1.

With respect to such manuscript 21, the reading section 11 obtains manuscript data including the watermark information 25 and the standard information 26 through a reading operation.

Then, the analyzing section 12 has a function to analyze the manuscript data obtained by the reading section 11. The analyzing section 12 first takes out image data corresponding to the image 22 so as to decide a watermark information analysis area; then takes out respective watermark information 25 from the watermark information analysis area; further takes out the standard information 26 from the manuscript data.

The abstracting section 13 has a function to analyze the respective watermark information 25 taken out by the analyzing section 12, and abstracts respective specific data i.e. identification information contained in the respective watermark information 25. The identification information abstracted by the abstracting section 13 is set to the same information as that used while making the standard information 26. For example, in the embodiment, in the case that the standard information 26 is made from the print operator number 25a, the abstracting section 13 abstracts the print operator number 25a from the watermark information 25 as the identification information.

The changing section 18 has a function to change the identification information abstracted by the abstracting section 13 from bit pattern to bit string; and through the same method as explained by using FIG. 3, to change the bit string into comparison information which has the same data form as the standard information 26. Moreover, in the case that the standard information 26 is changed by using Hash function, the bit string is also changed by using Hash function.

The judging section 14 has a function to, on the basis of the standard information 26 taken out by the analyzing section 12 and the respective identification information abstracted by the abstracting section 13 and changed by the changing section 18, calculate a correspondency rate R of the plural identification information with respect to the standard information 26; and through comparing the correspondency rate R with a predetermined threshold value $R_{TH}$, judge a degradation state of the watermark information 25.

The standard form storing section 16 is storing information relative to a standard form of the manuscript 21.

Figure 4:
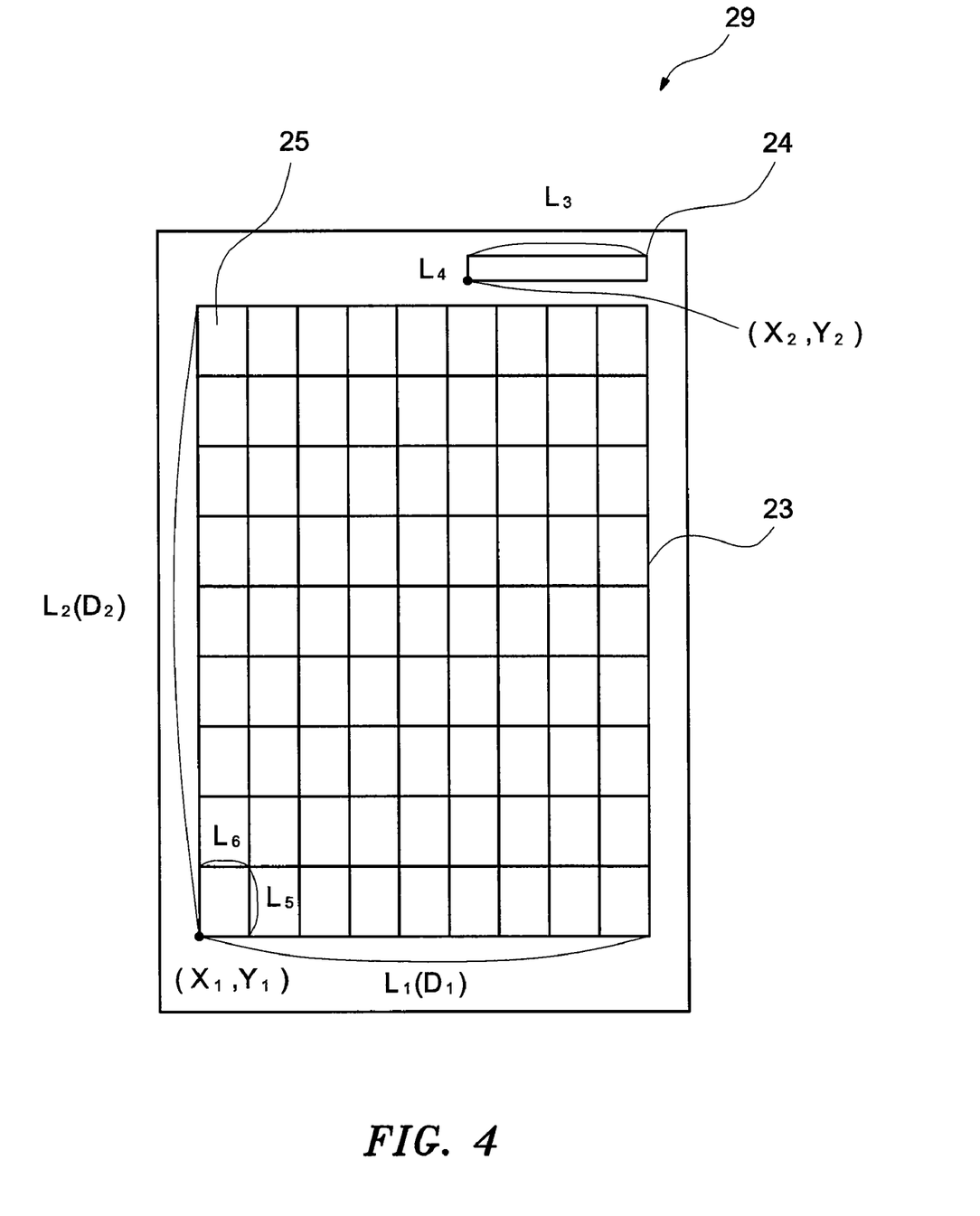
FIG. 4 is an explanation diagram showing a standard form corresponding to manuscript.

FIG. 4 is an explanation diagram showing a standard form corresponding to manuscript.

As shown by FIG. 4, a standard form 29 has information relative to an origin position $(X_1, Y_1)$ of the image formation area 23 on the manuscript 21 and a size $(L_1, L_2)$; information relative to an origin position $(X_2, Y_2)$ of the specific area 24 and a size $(L_3, L_4)$; information relative to an arrangement number $(D_1, D_2)$ of the watermark information 25 and a size $(L_5, L_6)$ of a region occupied by each watermark information 25; and the like.

Through using the standard form 29, the reading section 11, the analyzing section 12 and the abstracting section 13 performs respective operations.

Further, the storing section 17 has a function to temporarily store the image data read by the reading section 11, the watermark information 25 and the standard information 26 taken out by the analyzing section 12, the identification information abstracted by the abstracting section 13 and the like.

The printing section 19 has a function to, in the case that the watermark information 25 is judged by the judging section 14 that it does not degrade, receive an instruction from the controlling section 20 and print the read manuscript data on a copy paper.

The threshold value storing section 30 is storing a predetermined threshold value $R_{TH}$ stated above for the correspondency rate R. The predetermined threshold value $R_{TH}$ is decided on the basis of an important degree or a secret degree. As the predetermined threshold value $R_{TH}$, it is possible to use, for example, "60%", "70%" or "80%". In the embodiment, the predetermined threshold value $R_{TH}$ is set to "80%".

Figure 7:
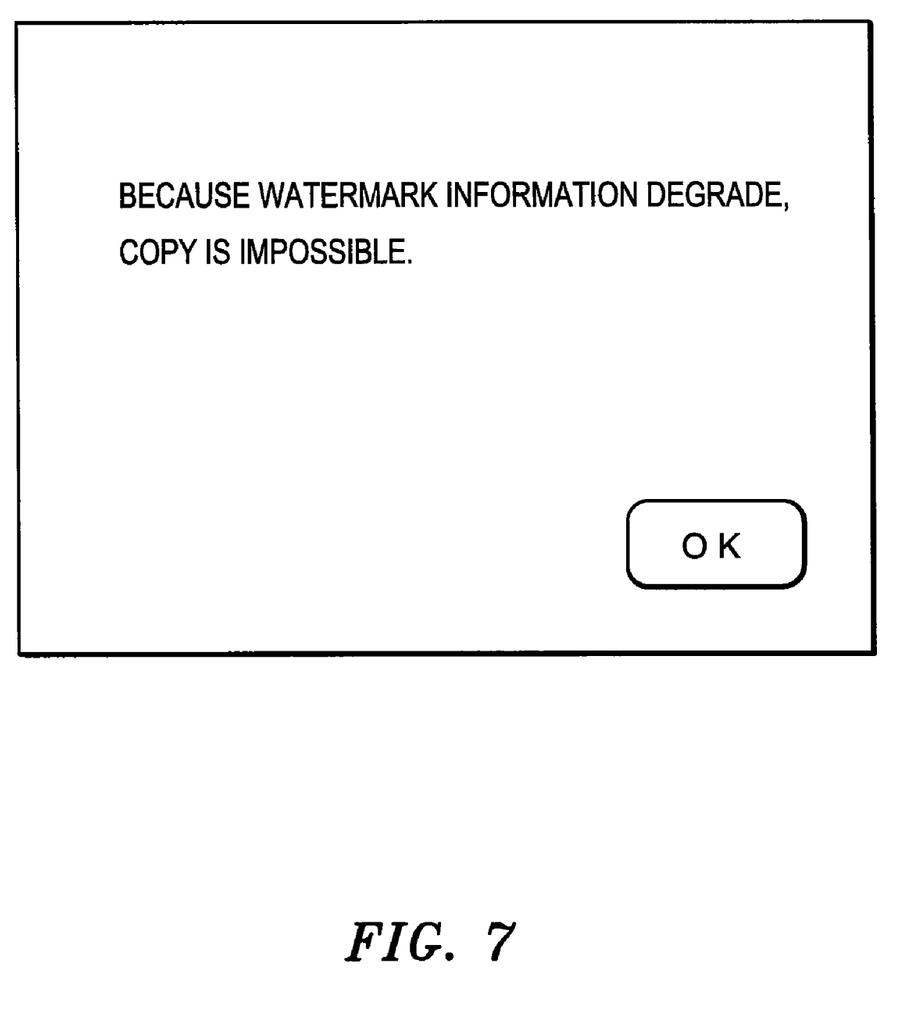
FIG. 7 is an explanation diagram showing a display scene of stop content.

The displaying section 15 is a touch panel such as LCD and the like. In the case that the watermark information 25 is judged by the judging section 14 that it degrades, as shown by FIG. 7, the displaying section 15 performs a display indicating to stop copy.

The controlling section 20 performs a whole control for make the above-stated respective sections 11-19 and 30 realize respective functions. In the controlling section 20, control program is stored. p <Operation of Embodiment 1>

The following is to explain operation of the image forming apparatus 10 of the present invention in detail along a flowchart.

Moreover, in the explanation of the operation of the embodiment, the standard information 26 is made from the print operator number 25a as an example.

Figure 5:
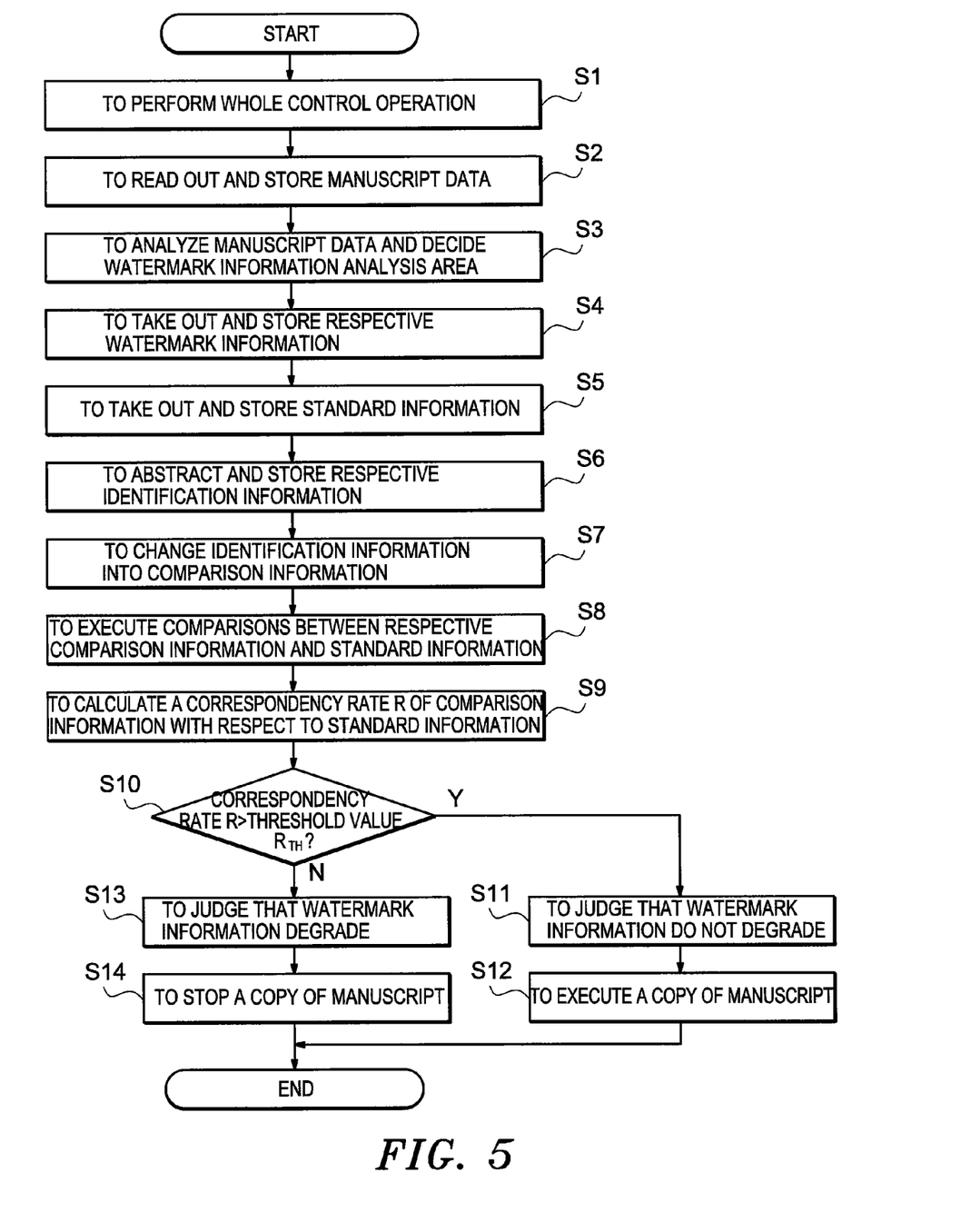
FIG. 5 is a flowchart showing operations of an image forming apparatus in embodiment 1 of the present invention.

FIG. 5 is a flowchart showing operations of an image forming apparatus 1 of the present invention.

First, when user sets the manuscript 21 onto a set plate (not shown), the controlling section 20 starts control program so as to perform a whole control operation (Step 1).

The controlled reading section 11 scans the manuscript 21 to read manuscript data from the manuscript 21, and has the storing section 17 store the manuscript data (Step 2).

Then, the analyzing section 12 analyzes the manuscript data read by the reading section 11, takes out image data corresponding to the image 22, and decides a watermark information analysis area (Step 3).

Figure 6:
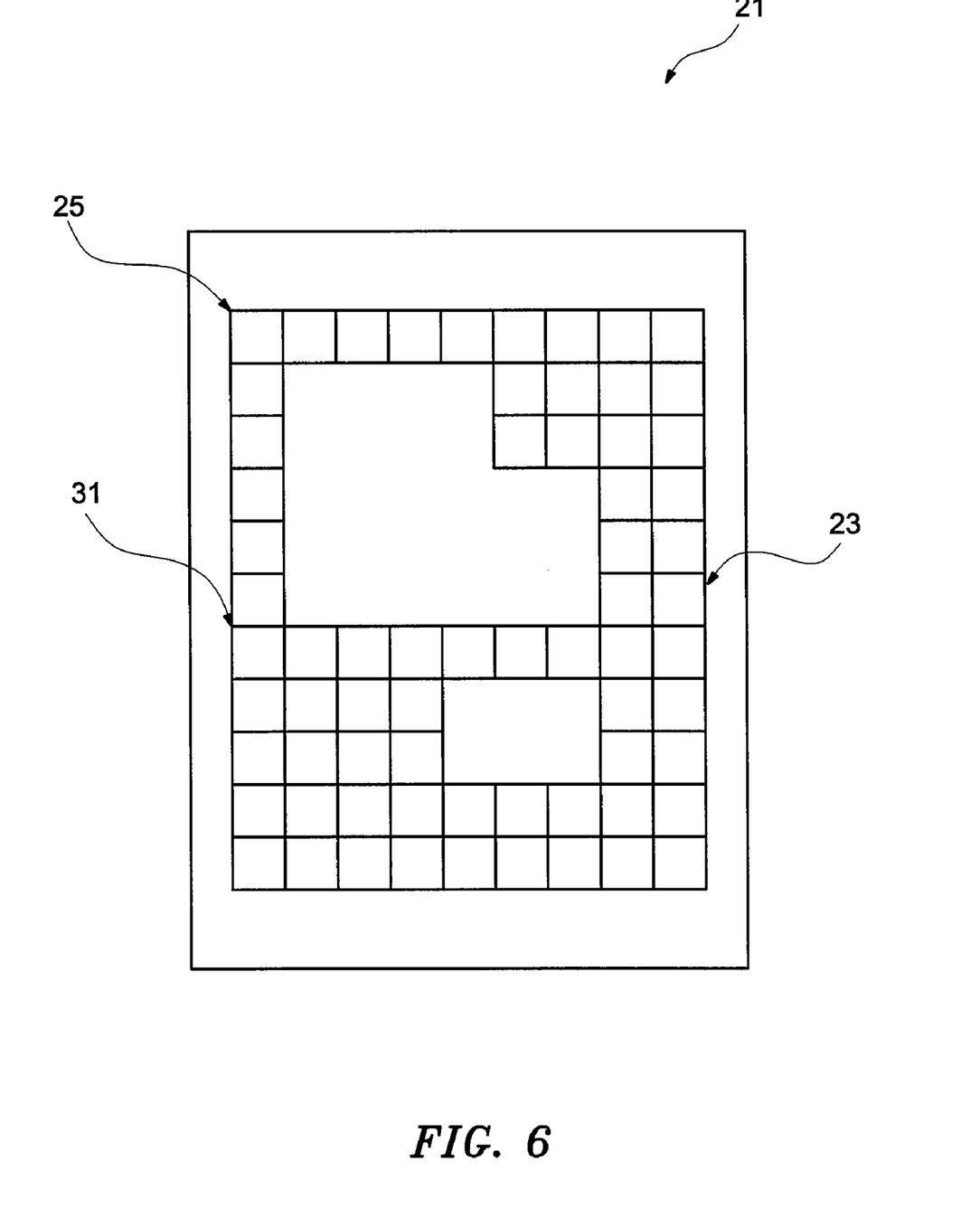
FIG. 6 is an explanation diagram showing an watermark information analysis area.

The watermark information analysis area can be obtained by, for example, investigating image concentration in the region decided by the size $(L_5, L_6)$ of watermark information 25 indicated in the standard form 29. The image concentration in region on which the watermark information 25 and the image 22 overlap is higher than that in region on which only the watermark information 25 is formed. Therefore, through getting the respective image concentrations with respect to all watermark information 25 in the image formation area 23 and judging the differences of the image concentrations, as shown by FIG. 6, it is possible to obtain region in which there is no the image 22, that is, obtain a watermark information analysis area 31.

Continuously, the analyzing section 12 takes out the respective watermark information 25 in the watermark information analysis area 31 on the basis of the standard form 29 stored in the standard form storing section 16, and has the storing section 17 store these watermark information 25 (Step 4).

Further, the analyzing section 12 takes out the standard information 26 in the specific area 24 on the basis of the standard form 29 and has the storing section 17 store the standard information 26 (Step 5).

Then, the abstracting section 13 executes an analysis with respect to the respective watermark information 25 in the watermark information analysis area 31; abstracts identification information from the respective watermark information 25 and has the storing section 17 store the identification information (Step 6).

Moreover, the abstracted identification information is the print operator number 25a contained in the watermark information 25. The print operator number 25a, for example, as shown by FIG. 2, is printed in a predetermined position in the region of the watermark information 25. Therefore, the abstracting section 13 abstracts the information printed in the predetermined position, as the identification information.

When the identification information are abstracted, the changing section 18 changes the identification information from bit pattern to bit value and change the bit value into comparison information which has the same data form as the standard information 26 through the same processing method as explained by using FIG. 3 (Step 7).

Continuously, the judging section 14 uses the standard information 26 stored in the storing section 17 to perform comparisons between the respective comparison information and the standard information 26 (Step 8); and calculates a correspondency rate R from the total number $N_T$ of the watermark information 25 in the watermark information analysis area 31, i.e. the total number $N_T$ of the comparison information and the number N of the comparison information that respectively correspond to the standard information 26 (R(%)= $N/N_T \times 100$) (Step S9); further compares the correspondency rate R with the predetermined threshold value $R_{TH}$ (in the embodiment, $R_{TH}$=80%) previously stored in the threshold value storing section 30 (Step 10).

On the one hand, the judging section 14, when judged that the calculated correspondency rate R exceeds the predetermined threshold value $R_{TH}$ (Step 10), judges that the watermark information 25 does not degrade (Step 11). In the case, the controlling section 20 starts the printing section 19 to perform a copy of the manuscript 21 (Step 12).

On the other hand, the judging section 14, when judged that the calculated correspondency rate R is the predetermined threshold value $R_{TH}$ or under (Step 10), judges that the watermark information 25 has degrade (Step 13). In the case, the controlling section 20 has the displaying section 15 display a message expressing to stop copy, and stops the copy of the manuscript 21 (Step 14).

Moreover, the message on the scene of the displaying section 15 disappears when an OK button on the scene is pressed or when th manuscript 21 is removed from the set plate.

Moreover, in the embodiment, the information relative to the standard form of the manuscript 21 is previously stored in the standard form storing section 16 of the image forming apparatus 10. However, instead of it, it is possible to state the information relative to the standard form outside the image formation area 23 of the manuscript 21. Then, the information can be read by the reading section 11.

According to the embodiment 1 of the present invention, the plural watermark information 25 buried in the image formation area 23 of the manuscript 21 are respectively compared with the standard information 26 stated in the specific area 24 of the manuscript 21 so as to judge the degradation state of the watermark information 25, when the watermark information 25 are judged that they degrade, the copy of the manuscript 21 is stopped. Therefore, it is possible to limit an ease copy of the manuscript whose watermark information can not be analyzed, so that it is possible to keep the manuscript secret.

<Embodiment 2>

The following is to explain embodiment 2. Moreover, regarding the same composition as the embodiment 1, it will be assigned the same symbol, and its same explanation will be omitted.

<Structure of Embodiment 2>

Figure 8:
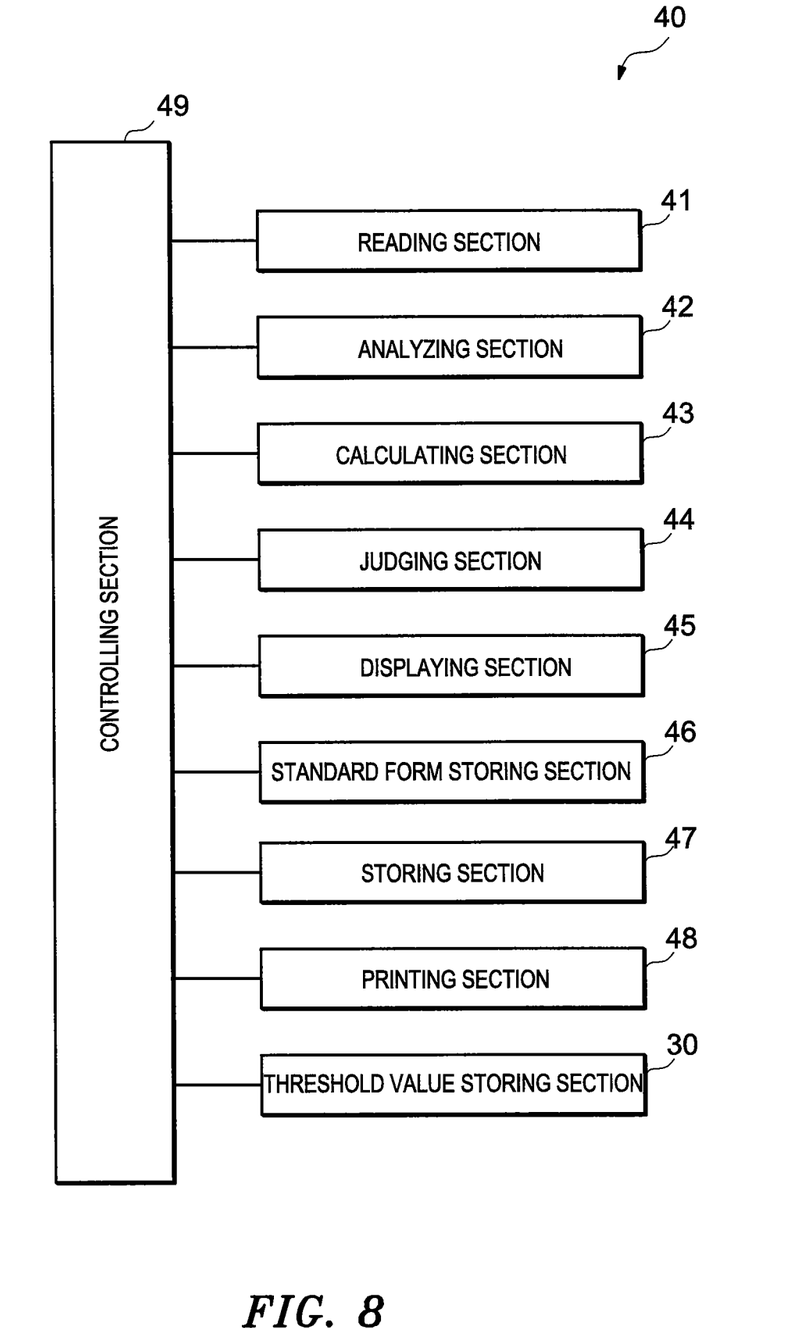
FIG. 8 is a block diagram showing a structure of an image forming apparatus in embodiment 2 of the present invention.

FIG. 8 is a block diagram showing a structure of an image forming apparatus in embodiment 2 of the present invention.

An image forming apparatus 40 of the present invention as shown by FIG. 8, in order to copy manuscript in which watermark information is plurally buried, comprises a reading section 41, an analyzing section 42, an calculating section 43, a judging section 44, a displaying section 45, a standard form storing section 46, a storing section 47, a printing section 48, a threshold value storing section 30, and a controlling section 49 which is used for controlling these sections 41-48 and 30.

The reading section 41 executes operation to read manuscript data with respect to a manuscript.

Figure 9:
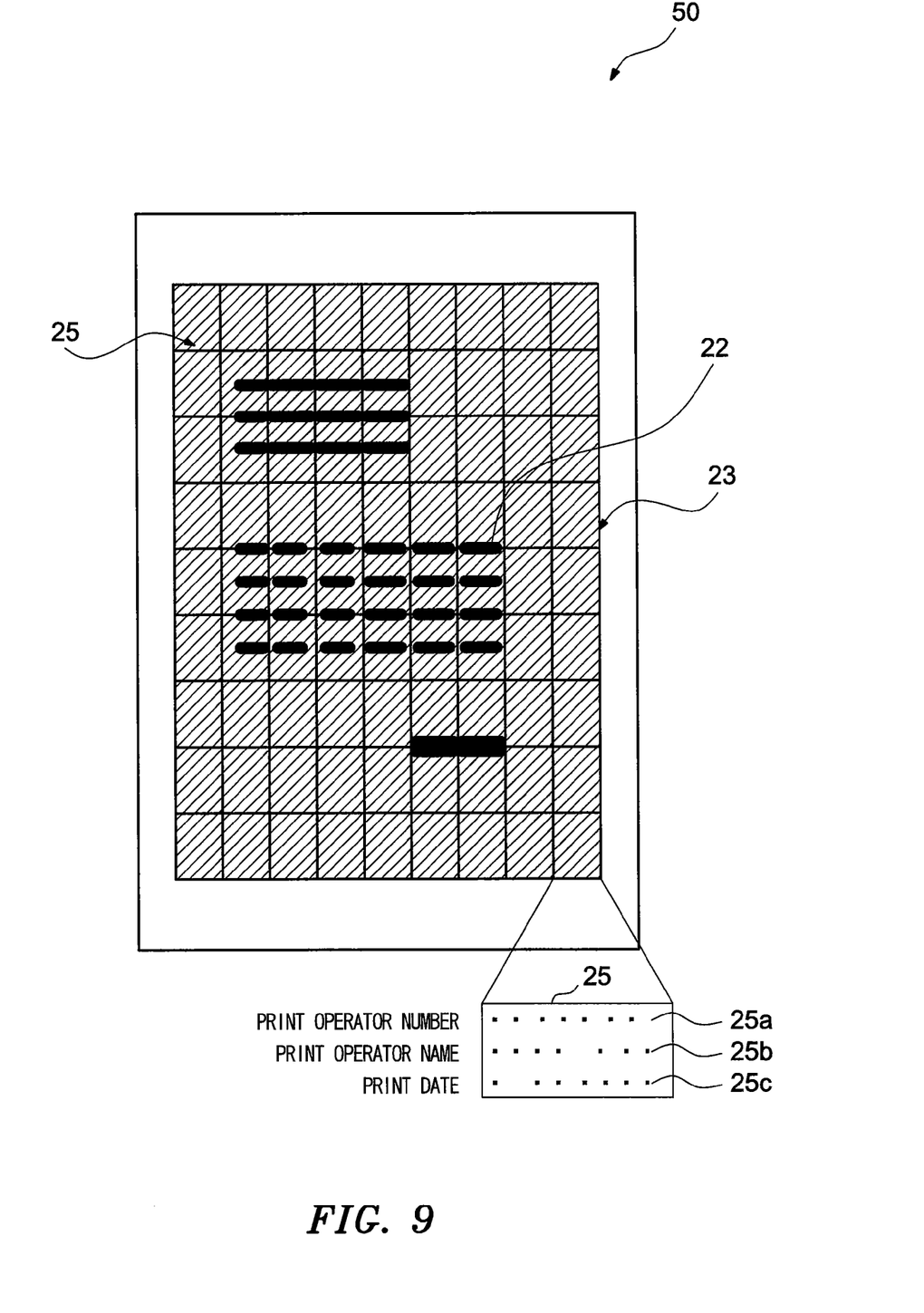
FIG. 9 is an explanation diagram showing a formation of a manuscript in embodiment 2 of the present invention.

FIG. 9 is an explanation diagram showing a formation of a manuscript in embodiment 2 of the present invention.

As shown by FIG. 9, on a manuscript 50, an image formation area 23 is furnished, and an image 22 made from image data is formed in the image formation area 23.

In the image formation area 23, identification information relative to the image 22 is plurally buried as covering whole page, as watermark information 25. The identification information is, for example, print operator number 25a, print operator name 25b, print date 25c or the like of the image 22. Then, through changing the information into character code, bit information is obtained. The bit information is buried in the image formation area 23 as bit pattern formed according to whether dot exists.

With respect to such manuscript 50, the reading section 41 obtains manuscript data including the watermark information 25 and image data of the image 22 through a reading operation.

Further, the analyzing section 42 has a function to analyze the manuscript data obtained by the reading section 41. The analyzing section 42 first takes out image data corresponding to the image 22 so as to decide a watermark information analysis area; then takes out respective watermark information 25 from the watermark information analysis area.

The calculating section 43 has a function to analyze the respective watermark information 25 taken out by the analyzing section 42, and calculates standard information used when to judge whether the watermark information 25 degrades. Here, the calculation method of the standard information is first to change bit pattern of the watermark information 25 into respective bit strings and store these bit strings to the storing section 47 as watermark analysis data; then to obtain a majority decision of "1" or "0" with respect to the same bit position of the respective watermark analysis data. Its details will be explained below.

The judging section 44 has a function to, with respect to the standard information made up of bit string calculated by the calculating section 43; calculate a correspondency rate R of the respective watermark information 25 changed to bit strings, that is, of the respective watermark analysis data; and through comparing the correspondency rate R with a predetermined threshold value $R_{TH}$, judge a degradation state of the watermark information 25.

The standard form storing section 46 is storing information relative to a standard form of the manuscript 50. Through using the standard form, the reading section 41 and the analyzing section 42 performs respective operations. Moreover, the standard form is about the same as the standard form 29 shown by FIG. 4. An unique difference is that there is no information relative to the specific area 24.

Further, the storing section 47 has a function to temporarily store the image data read by the reading section 41, the watermark information 25 taken out by the analyzing section 42, the respective watermark analysis data analyzed by the calculating section 43 and the standard information calculated by the calculating section 43 and the like.

The printing section 48 has a function to, in the case that the watermark information 25 is judged by the judging section 44 that it does not degrade, receive an instruction from the controlling section 49 and print the read manuscript data on a copy paper.

The threshold value storing section 30 is storing a predetermined threshold value $R_{TH}$ stated above for the correspondency rate R. The predetermined threshold value $R_{TH}$ is decided on the basis of an important degree or a secret degree. As the predetermined threshold value $R_{TH}$, it is possible to use, for example, "60%", "70%" or "80%". In the embodiment, the predetermined threshold value $R_{TH}$ is set to "80%".

The displaying section 45 is a touch panel such as LCD and the like. In the case that the watermark information 25 is judged by the judging section 44 that it degrades, as shown by FIG. 7, the displaying section 45 performs a display indicating to stop copy.

The controlling section 49 performs a whole control for make the above-stated respective sections 41-48 and 30 realize respective functions. In the controlling section 49, control program is stored.

<Operation of Embodiment 2>

The following is to explain operation of the image forming apparatus 40 of the present invention in detail along a flowchart.

Moreover, in the explanation of the operation of the embodiment, the standard information 26 is made from the print operator number 25a as an example.

Figure 10:
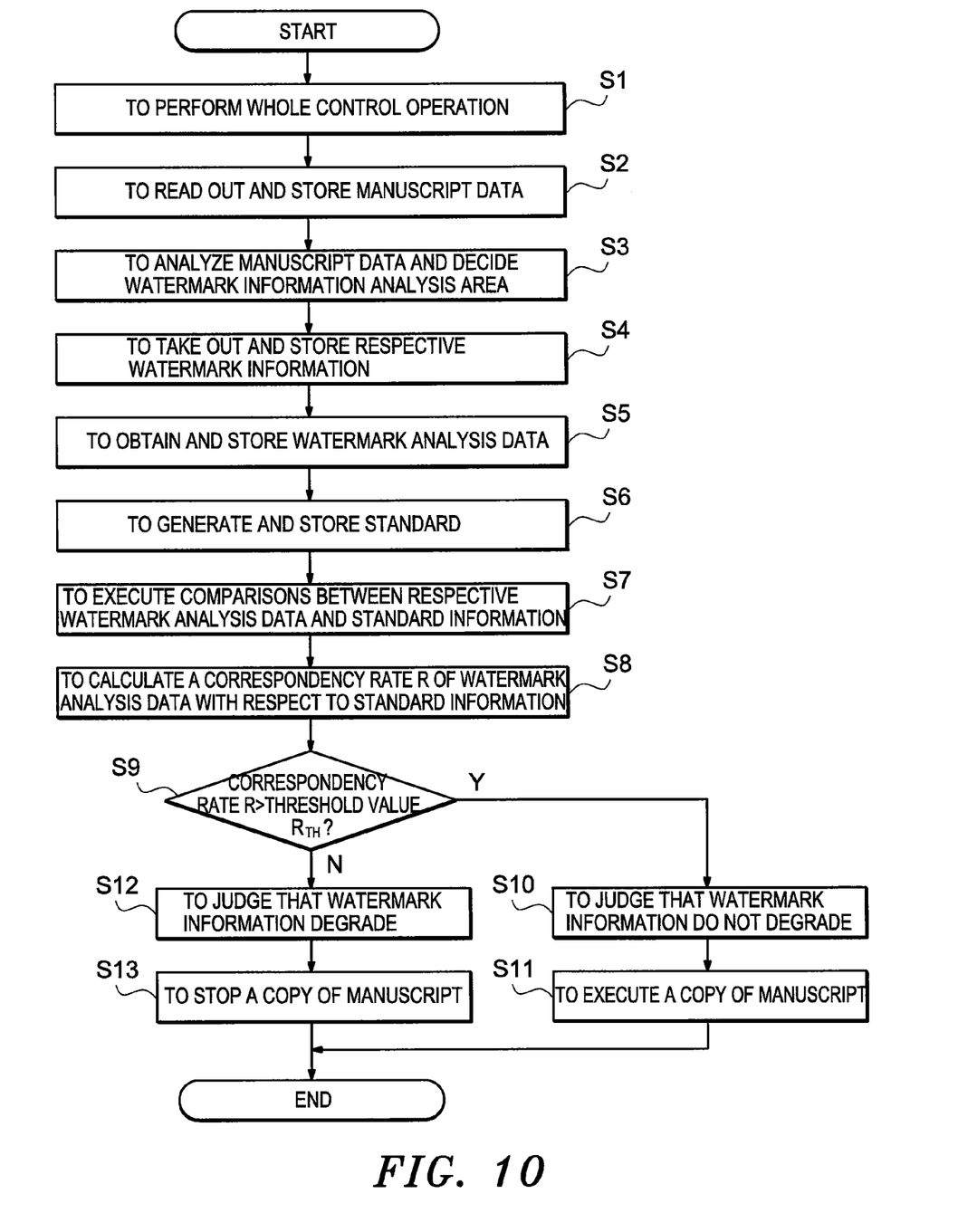
FIG. 10 is a flowchart showing operations of an image forming apparatus in embodiment 2 of the present invention.

FIG. 10 is a flowchart showing operations of an image forming apparatus in embodiment 2 of the present invention.

First, when user sets the manuscript 50 onto a set plate (not shown), the controlling section 49 starts control program so as to perform a whole control operation (Step 1).

The controlled reading section 41 scans the manuscript 50 to read manuscript data from the manuscript 50, and has the storing section 47 store the manuscript data (Step 2).

Then, the analyzing section 42 analyzes the manuscript data read by the reading section 41; then takes out image data corresponding to the image 22 and decides a watermark information analysis area through using the same method as the embodiment 1 (Step 3).

Continuously, the analyzing section 42 takes out the respective watermark information 25 in the watermark information analysis area 31 on the basis of the standard form stored in the standard form storing section 46, and has the storing section 47 store these watermark information 25 (Step 4).

Then, the calculating section 43 executes an analysis with respect to the respective watermark information 25 in the watermark information analysis area 31; changes the respective watermark information 25 from bit pattern to bit string; and has the storing section 47 store the bit strings as watermark analysis data (Step 5).

Further, with respect to the respective bit strings of the respective watermark information 25, the calculating section 43 calculates bit value ("1" or "0") which occupies majority in the same bit position so as to obtain a bit string made up of the bit values of majority decision; and has the storing section 47 store the bit string of majority decision as standard information (Step 6).

Figure 11:
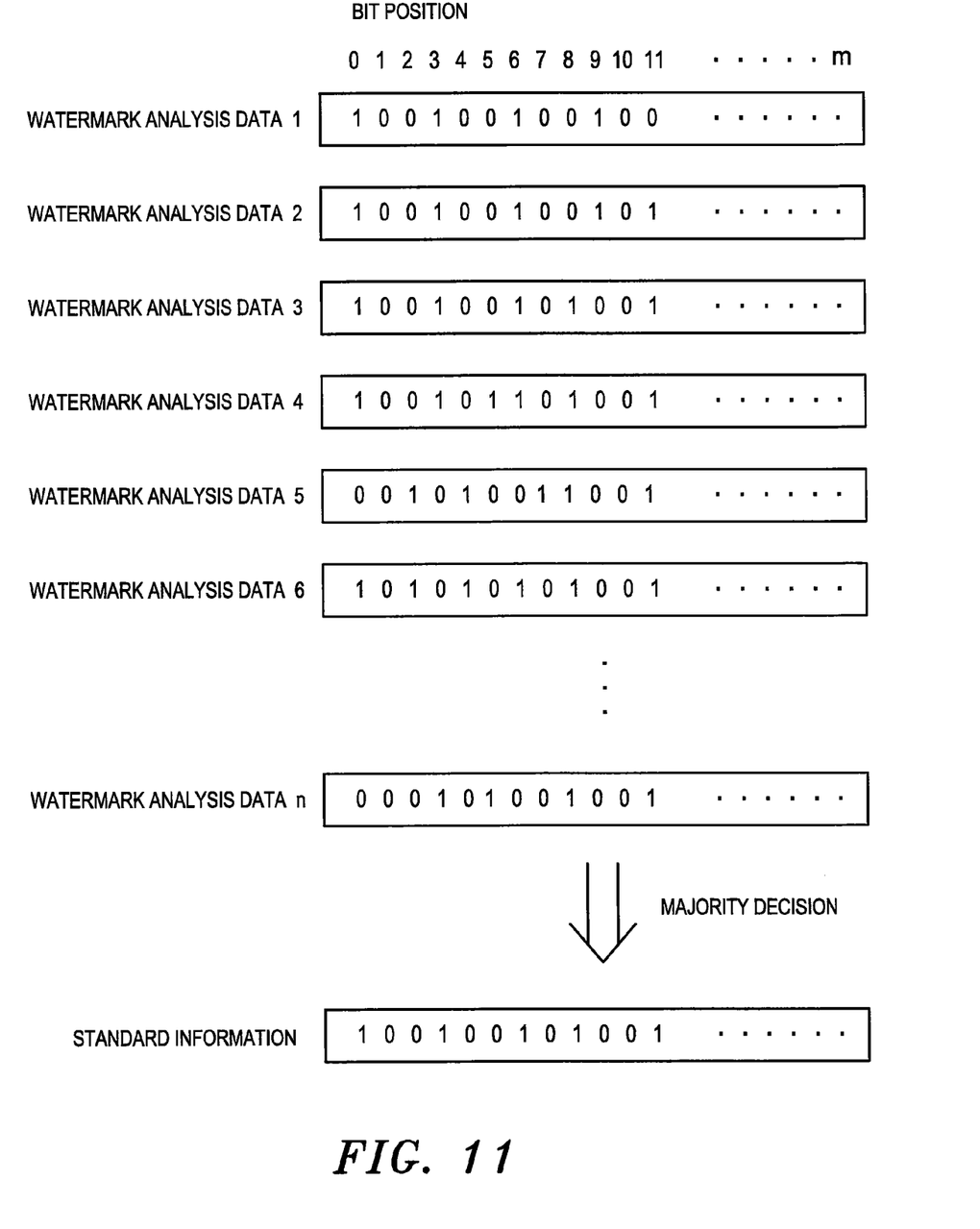
FIG. 11 is an explanation diagram showing a method to make standard information from respective watermark analysis data.

FIG. 11 is an explanation diagram showing a method to make standard information from respective watermark analysis data. In the FIG. 11, n watermark analysis data made from bit strings are shown. To correspond to the respective bit positions of 0, 1, 2, ..., 11, ..., m, these watermark analysis data 1~n respectively are "100100100100 . . . ", "100100100101 . . . ", ..., "000101001001 . . . ".

For example, in the bit position of 0, with respect to the total number of n, in the case that the number of the bit value "1" exceeds n/2, a bit value "1" is taken out as majority decision bit value; in the case that the number of the bit value "1" is under n/2, a bit value "0" is taken out as majority decision bit value. Moreover, such case that the number of the bit value "1" equals to the number of the bit value "0" may be considered, in fact, the number of bit value of one side is overwhelmingly more than the number of bit value of other side, so there is no hindrance to use such judgment method of n/2 serving as a threshold value.

Further, with respect to the other bit positions 1~m, the same majority decision judgments are performed. Then, standard information made up of a bit string of majority decision is calculated.

The judging section 44 executes comparisons of the standard information and the respective watermark analysis data that are calculated by the calculating section 43 (Step 7); and calculates a correspondency rate R from the total number $N_T$ of the watermark analysis data in the watermark information analysis area 31 and the number N of the watermark analysis data that respectively correspond to the standard information ($R(\%)=N/N_T\times100$) (Step S8); further compares the correspondency rate R with the predetermined threshold value $R_{TH}$ (in the embodiment, $R_{TH}=80\%$) previously stored in the threshold value storing section 30 (Step 9).

On the one hand, the judging section 44, when judged that the calculated correspondency rate R exceeds the predetermined threshold value $R_{TH}$ (Step 9), judges that the watermark information 25 does not degrade (Step 10). In the case, the controlling section 49 starts the printing section 48 to perform a copy of the manuscript 50 (Step 11).

On the other hand, the judging section 44, when judged that the calculated correspondency rate R is the predetermined threshold value $R_{TH}$ or under (Step 9), judges that the watermark information 25 has degrade (Step 12). In the case, the controlling section 49 has the displaying section 45 display a message expressing to stop copy, and stops the copy of the manuscript 50 (Step 13). Moreover, the message on the scene of the displaying section 45 disappears when an OK button on the scene is pressed or when the manuscript 50 is removed from the set plate.

Moreover, in the embodiment, the information relative to the standard form of the manuscript 50 is previously stored in the standard form storing section 46 of the image forming apparatus 40. However, instead of it, it is possible to state the information relative to the standard form outside the image formation area 23 of the manuscript 50. Then, the information can be read by the reading section 41.

According to the embodiment 2 of the present invention, because it is unnecessary to change the respective watermark information 25 to the same data form as the standard information, it is possible to easily perform a judgment with respect to the degradation state of the watermark information 25.

The present invention is not limited to the foregoing embodiments but many modifications and variations are possible within the spirit and scope of the appended claims of the invention.

What is claimed is:

1. An image forming apparatus having a manuscript copy function, comprising:
    (a) a reading section for reading said manuscript having image data in which at least watermark information is plurally buried, said image data is formed in an image formation area;
    (b) a judging section for judging a degradation state of said watermark information by comparing said watermark information with predetermined standard information, said standard information being furnished in a predetermined position outside said image formation area of said manuscript and being read by said reading section; and
    (c) a controlling section for limiting a copy of said manuscript when said judging section judges that said watermark information is degraded,
    (d) wherein said judging section calculates a correspondence rate of said watermark information on the basis of the total number of said watermark information that are compared with said standard information and the number of said watermark information that correspond to said standard information, and judges that said watermark information are degraded when said correspondence rate is under a predetermined threshold value.

2. The image forming apparatus according to claim 1, wherein said standard information is calculated through a predetermined logical calculation with respect to bit strings of 8-bits that are obtained by dividing a bit string of 40-bits.

3. The image forming apparatus according to claim 1, further comprising:
    an analyzing section for analyzing said watermark information read by said reading section,
    wherein said watermark information is a print operator number, a print operator name and a print date.

4. The image forming apparatus according to claim 3, further comprising:
    an abstracting section for abstracting said watermark information analyzed by said analyzing section.

5. The image forming apparatus according to claim 4, further comprising:
    a changing section,
    wherein said watermark information is formed from a bit pattern;
    said changing section changes said bit pattern abstracted by said abstracting section into bit string, and further changes said bit string into the same data form as said standard information.

6. The image forming apparatus according to claim 1, wherein said predetermined threshold value is 80%.

7. The image forming apparatus according to claim 5, wherein said changing section changes said bit string by using a Hash function.

8. An image forming apparatus having a manuscript copy function comprising:
    (a) a reading section for reading said manuscript having image data in which watermark information is plurally buried data;
    (b) a judging section for judging a degradation state of said watermark information by comparing said watermark information with predetermined standard information;
    (c) a calculating section, for calculating said standard information from the plural watermark information read by said reading section; and
    (d) a controlling section for limiting a copy of said manuscript when said judging section judges that said watermark information is degraded,
    (e) wherein
    said judging section calculates a correspondence rate of said watermark information on the basis of the total number of said watermark information that are compared with said standard information and the number of said watermark information that correspond to said standard information, and judges that said watermark information are degraded when said correspondence rate is under a predetermined threshold value.

9. The image forming apparatus according to claim 8, wherein said watermark information is formed from a bit pattern;
    said calculating section changes said bit pattern into a bit string, and calculates said standard information on the basis of a majority decision of "1" or "0" in the same bit position of said plural bit strings.

10. The image forming apparatus according to claim 9, wherein said predetermined threshold value is 80%.

11. The image forming apparatus according to claim 8, further comprising:
    an analyzing section for analyzing said watermark information read by said reading section;
    wherein said watermark information is a print operator number, a print operator name and a print date.

12. The image forming apparatus according to claim 11, further comprising:
    an abstracting section for abstracting said watermark information analyzed by said analyzing section.

* * * * *